Patented Aug. 6, 1940

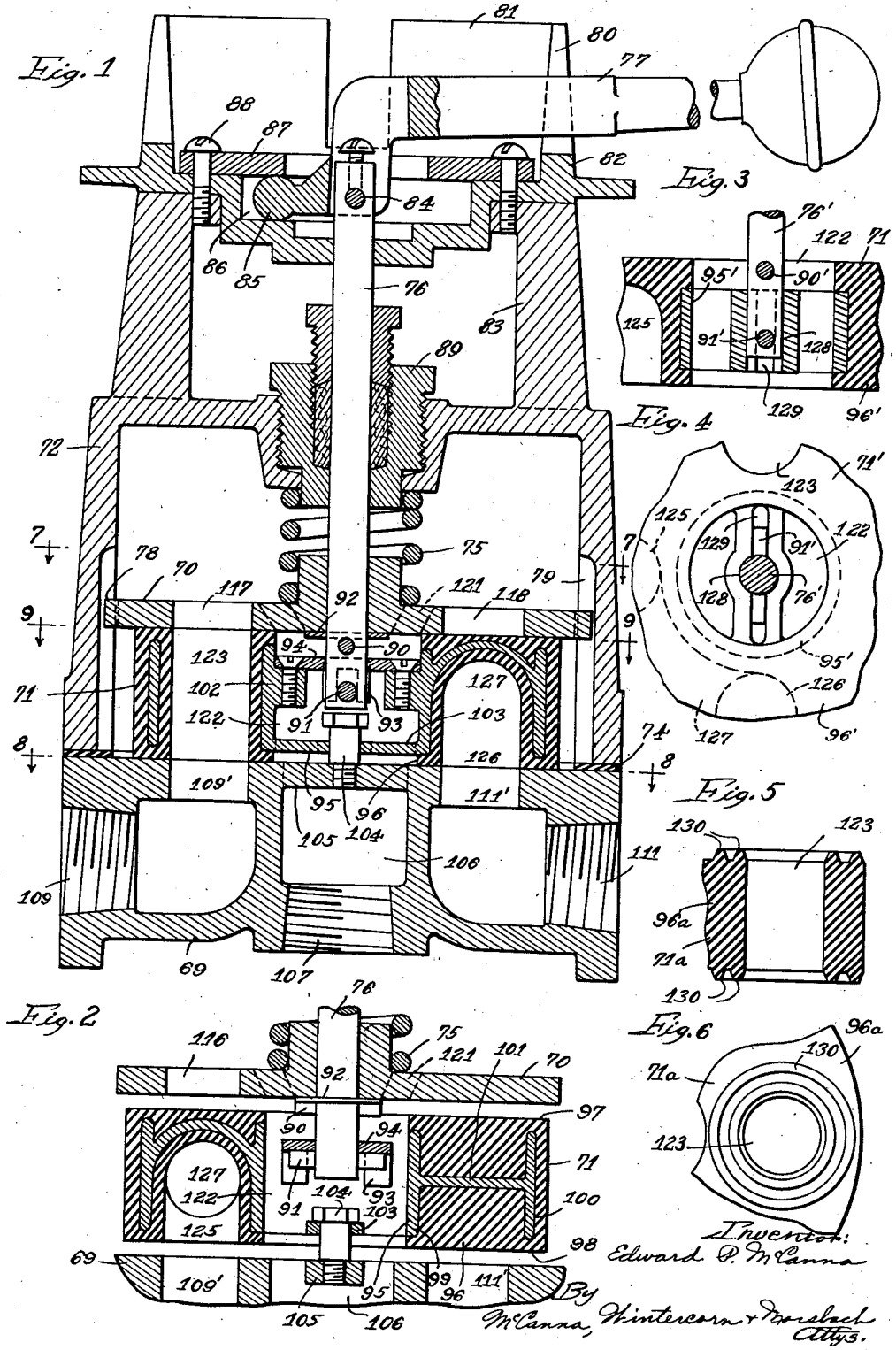

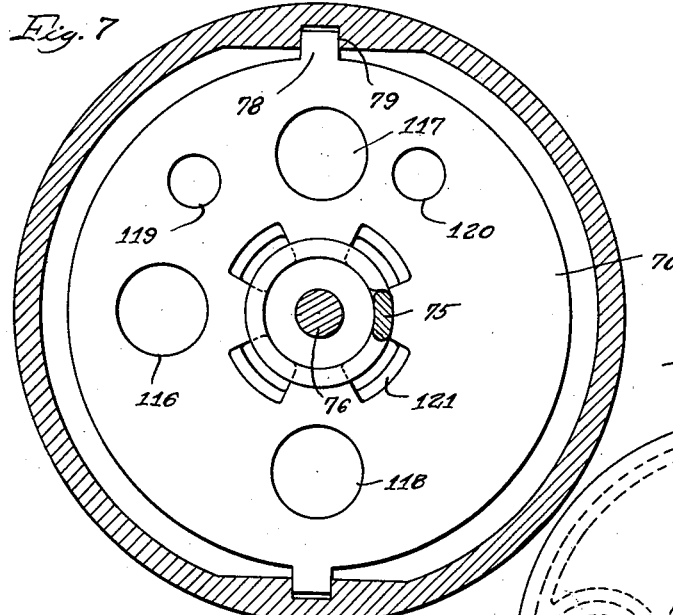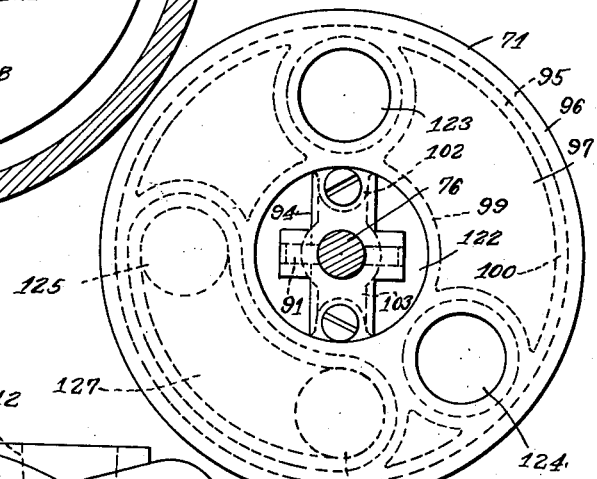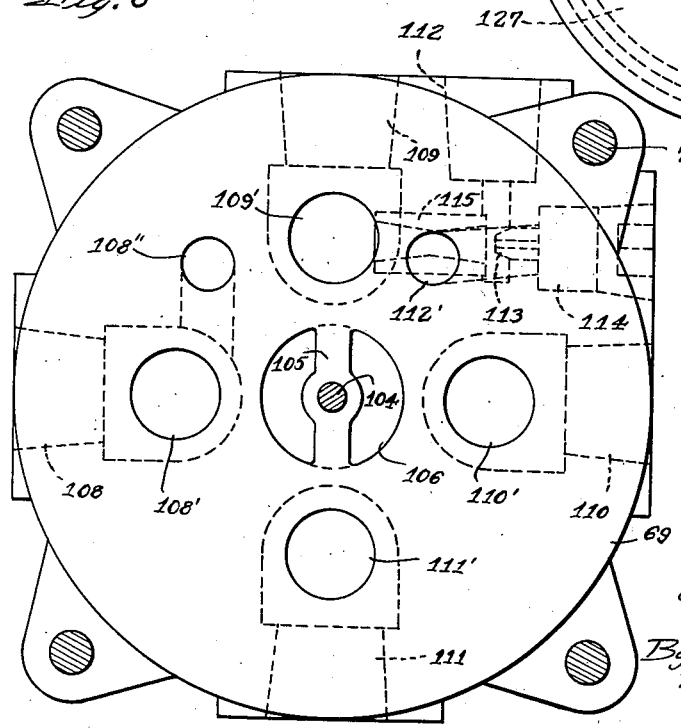

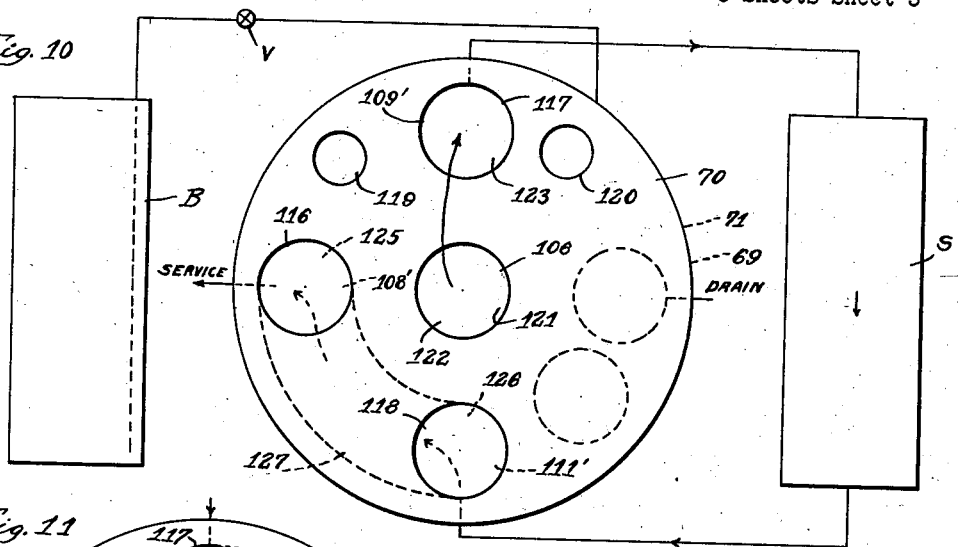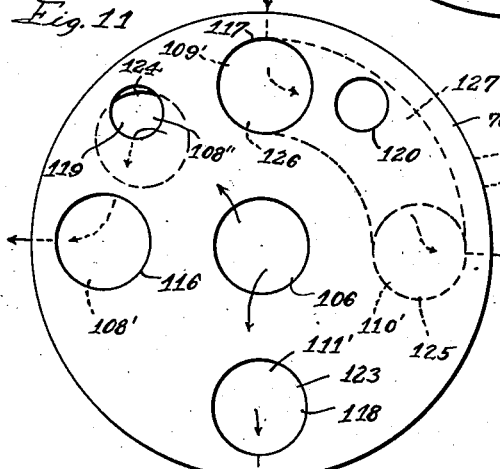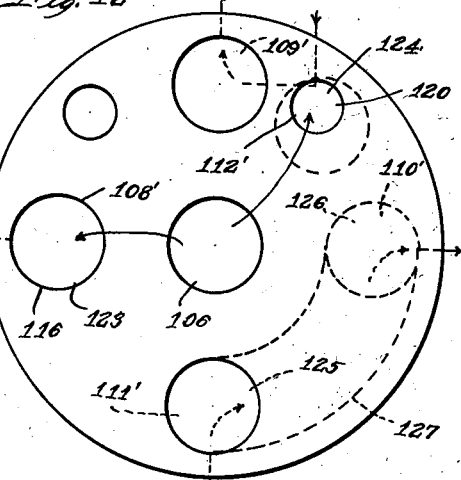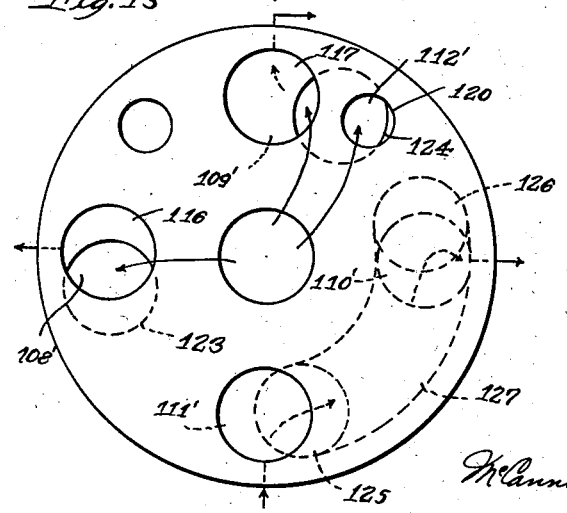

2,209,989

UNITED STATES PATENT OFFICE 2,209,989

ROTARY TYPE MULTIPORT VALVE

Edward P. McCanna, Rockford, Ill., assignor to Elgin Softener Corporation, Elgin, Ill., a corporation of Illinois Application September 23, 1938, Serial No. 231,354

20 Claims. (Cl. 251—90)

This invention relates to rotary type multiport valves especially designed and adapted for use with base exchange water softeners, filters, etc.

Numerous designs of multiport valves have been made where the rotor is arranged to be lifted, turned, and re-seated on a rubber gasket or gaskets, but such valves have invariably been complicated and expensive to manufacture and were subject to certain serious objections. It is the principal object of my invention to provide rotary type multiport valves of simpler and more economical construction, avoiding so far as possible the objections to the previous designs.

A salient feature of the valve of my invention is the provision of a ported intermediate sealing member between the ported valve members, shiftable with respect to said members from one position to another. In the present case, the intermediate member is rotatable with respect to the valve members and the valve members are arranged to be separated whenever the intermediate member is to be turned from one operative position to another, after which the valve members reengage the intermediate member to seal the valve in its new position.

An important feature is the provision in connection with the rotary intermediate member of spring means normally tending to engage the ported valve members firmly against opposite sides of the intermediate member, and means for positively insuring separation of the intermediate member from both of the valve members prior to the turning of the intermediate member from one operative position to another.

Another important feature is the provision in a valve of the kind just mentioned of an intermediate member of molded rubber or composition material having a metallic insert therein for reenforcement around the ports and along the passage therein and to provide a place for making operating connections for the intermediate member with the ported stator and operating stem of the valve.

Still another feature is the provision in a valve of the kind just mentioned of a molded intermediate member having annular projecting beads around the ports on the opposed sealing faces of said member for good sealing engagement with the ported valve members.

The invention will be better understood as reference is made in the following description to the accompanying drawings, wherein—

Fig. 1 is a central vertical section through a valve made in accordance with my invention;

Fig. 2 is a fragmentary sectional view corresponding to a portion of Fig. 1, but showing the ported valve members separated from the intermediate member preparatory to rotation of the latter from one position to another;

Figs. 3 and 4 are fragmentary details in vertical and horizontal section, respectively, illustrating a modified construction of the intermediate sealing member;

Figs. 5 and 6 are other fragmentary details in vertical section and plan, respectively, showing another modified form of intermediate sealing member;

Figs. 7 and 8 are horizontal sections on the correspondingly numbered lines of Fig. 1;

Fig. 9 is a view taken on the line 9—9 of Fig. 1, but showing only the intermediate sealing member in plan view;

Fig. 10 is a circuit diagram illustrating the operation of the valve during softening, and Figs. 11, 12 and 13 are similar views illustrating moved positions of the valve for backwash, salt wash and rinse, respectively.

Similar reference numerals are applied to corresponding parts throughout the views.

Referring to the drawings, 69 is the stator and it cooperates with the members 70, 71 and 72, 72 being a cover secured to the stator 69 by bolts 73, compressing a gasket 74 between the cover and stator to prevent leakage of water. The upper member 70 is non-rotatable and is arranged to be raised against the action of the coiled compression spring 75 by means of the stem 76 and hand lever 77 when the intermediate member 71 is to be turned from one position to another. The intermediate member has four different operating positions, as illustrated diagrammatically in Figs. 10 to 13, and after the intermediate member has been turned from one position to another, the upper member 70 is allowed to reseat thereon and the spring 75 holds the three members 69, 70, and 71 in water-tight engagement with one another, the spring acting between the cover 72 and the upper member 70, as shown. Lugs 78 are provided on the member 70 in diametrically opposed relation, and these are slidable freely in vertical grooves 79 provided in diametrically opposed relation on the inside of the cover 72. The rotatable intermediate member 71 is locked with the stem 76 against rotation until the hand lever 77 is raised out of whichever one of the four slots 80 it happens to be engaged in at the time. These slots are provided in an upwardly projecting rim 81 on an index plate 82 suitably secured on the upper end of projections 83 provided on top of the cover 72. The lever 77 is bifurcated intermediate its ends to receive the upper end of the stem 76, and a cross-pin 84 pivotally connects the lever with the stem at that point. The end 85 of the lever 77 works in an annular guideway 86 provided between the index plate 82 and a ring 87 fastened with the index plate to the cover 72 by screws indicated at 88. When the lever 77 is raised, its end 85 exerts a downward thrust on the index plate 82 as the stem 76 is raised to lift the upper member 70 and shortly thereafter the intermediate member 71, and when the lever 77 is clear of the slot 80, the lever may be moved side wise to turn the stem 76 and accordingly rotate the intermediate member 71. When the lever 77 comes into register with another selected slot 80, according to the position desired for the valve, the lever 77 can be lowered into the slot to seat first the intermediate member 71 and thereafter the upper member 70. The seating of the members 70 and 71 will, of course, be aided by the spring 75, but the operator can bear down upon the lever 77, as will soon appear, to exert some additional pressure on the intermediate member 71 to insure better seating. The stem 76 is reciprocable and rotatable in the stuffing box 89 provided in the top wall of the cover 72. Two cross-pins 90 and 91 are provided in vertically spaced relation on the lower end of the stem 76, the pin 90 being arranged to bear against a washer 92 under the upper member 70 to lift the same against the pressure of the spring 75 when the stem is raised, and the pin 91 having its ends slidably received in forked portions 93 extending downwardly from a plate 94 through which the lower end of the stem 76 extends. The plate 94 is fastened to a hollow casting 95 forming the frame work of the intermediate member 71. The latter has the body 96 thereof molded of rubber or any other suitable plastic material, the object being to provide non-metallic flat top and bottom surfaces 97 and 98 for good sealing engagement with the flat bottom of the upper member 70 and the flat top of the stator 69. The frame member 95, as will soon appear, is cored out to provide the ports and passage desired, and the plastic body material 96 is molded around this frame member so as to line the ports and passage. There are inner and outer concentric walls 99 and 100 on the frame member 95 joined by an integral transverse web 101 between the ports, so that the intermediate member 71 has the desired strength and rigidity even though this member is made up mainly of molded rubber for good sealing properties. The plate 94 is mounted within the inner circular wall 99, as clearly appears in Figs. 1 and 9, bosses 102 being provided on said wall to receive the fastening screws for said plate. A diametrically extending web 103 across the bottom of the frame member 95 at the center thereof has a stud 104 entered through a central opening therein and threaded in a diametrically extending web 105 provided in the central axial port 106 in the stator 69. The head of the stud 104 limits upward movement of the intermediate member 71 by coming into contact with the web 103, as shown in Fig. 2. It is clear in Fig. 2 that when the stem 76 is raised as far as it will go, the intermediate member 71 and the top member 70 are not only raised off the stator 69, but are furthermore separated from one another, so that there is nothing to interfere with the turning of the intermediate member from one position to another by rotation of the stem 76. If the intermediate member 71 tends to adhere to either of the members 69 and 70, the parts are bound to be separated as soon as the stem 76 is raised far enough to permit its being turned by means of the hand lever 77, and, of course, when the hand lever 77 is turned, the intermediate member 71 turns with it by virtue of the driving connection afforded by the cross-pin 91 working in the forked portions 93 on the plate 94.

The stator 69 has a central axial threaded hole 107 communicating with the central axial port 106, and there are four other radial threaded holes 90° apart, as indicated at 108 to 111 in Fig. 8, communicating with equidistantly spaced ports 108' to 111', respectively, opening to the flat top face of the stator, all at the same radial distance from the center port 106. An auxiliary port 108" communicates with the port 108', as shown. A threaded hole 112 provided in the stator 69 parallel with the hole 109 has a passage extending from the inner end thereof in transverse relation to a nozzle 113 that discharges water from a chamber 114 in the stator through a Venturi tube 115 into the port 109'. There is a port 112' opening from the flat top face of the stator 69 associated with the hole 112 and arranged to deliver water under pressure to the chamber 114 for discharge from the nozzle 113, whereby to siphon brine from a brine tank B communicating with the hole 112. Now, the top member 70 has three ports 116, 117 and 118, 90° apart, registering with the ports 108', 109' and 111', respectively, and has in addition two other ports 119 and 120 registering with the ports 108" and 112", respectively. Segmental shaped openings 121 are provided around the center of the top member 70 to communicate with the central pressure port 106 in the stator 69, so that when the valve is seated, as shown in Fig. 1, water under pressure can be delivered from the port 106 through the central port 122 in the intermediate member 71 and through the openings 121 into the cover 72 to flow out of the valve according to the position of rotary adjustment of the intermediate member 71. The latter has in addition to the central port 122, two through ports 123 and 124 approximately 135° apart, and two other ports 125 and 126 90° and 180° removed from the port 123, respectively, the ports 125 and 126 being interconnected by a passage 127.

In describing the operation of this valve, reference will be made to Figs. 10 to 13 showing the valve diagrammatically as connected with a water softener S and a brine tank B. In the normal softening operation, the incoming raw water from the supply port 106 passes through the communicating port 122 and openings 121 into the cover 72 and leaves the valve through the port 117 and communicating ports 123 and 109' and enters the top of the softener S for passage downwardly through the bed of water softening material. The softened water leaving the bottom of the softener re-enters the valve and flows through communicating ports 111' and 126 in the stator 69 and intermediate member 71 and flows through the passage 127 in the intermediate member and out through communicating ports 125 and 108' to the service system. This flow continues until the water softener requires regeneration, whereupon the operator raises the hand lever 77 to unseat the top member 70 and intermediate member 71 and then turns the lever 77 through 180° so as to correspondingly rotate the intermediate member 71 relative to the stator 69 and top member 70. The backwash position is illustrated in Fig. 11 in which it will be noticed that the passage 127 is the intermediate member 71 is 180° removed from the position shown in Fig. 10. During backwash the incoming raw water from the supply port 106 flows through the port 118 in the top member and through communicating port 123 in the intermediate member and port 111' in the stator into the bottom of the softener S for passage upwardly through the bed of water softening material so as to break up the bed preparatory to the salt wash flow and also wash out from the top of the tank whatever sediment accumulated on top of the bed during the softening operation. The water leaving the top of the softener re-enters the valve through the port 109' in the stator and flows through communicating port 126 in the intermediate member and through passage 127 out through the port 125 in the intermediate member and through communicating port 110' in the stator to the drain. This flow is continued for a predetermined time sufficient to thoroughly cleanse the bed and prepare it for the salt wash. During this interval, raw water may be by-passed to the service system by virtue of the fact that the port 124 in the intermediate member registers with the port 119 in the top member 70, and hence also with the auxiliary port 108'' in the stator 69, the flow being, of course, from the auxiliary port into the port 108' and thence to the service system. At the conclusion of the backwash flow, the operator again lifts the hand lever 77 to unseat the valve and then turns the lever in a clockwise direction through 90° to the salt wash position shown in Fig. 12, whereupon the valve is again seated. During salt wash, the incoming raw water is delivered through the port 120 in the top member 70 and communicating port 124 in the intermediate member 71 into the port 112' in the stator for discharge through the nozzle 113 (Fig. 8) so as to draw brine from the brine tank B and discharge it with the water into the port 109' communicating with the top of the softener S. The mixture of brine and water flowing downwardly through the bed of water softening material regenerates the same and the spent brine and released calcium and magnesium is discharged from the bottom of the softener and re-enters the valve through port 111'. The flow is then through communicating port 125 in the intermediate member 71 through passage 127 to the port 126 in the intermediate member and thence through communicating port 110' in the stator out to the drain. This backwash flow continues until the level in the brine tank B drops to a predetermined point, whereupon the valve V illustrated in Fig. 10 is closed so that no more brine will be used. During this salt wash flow, raw water may be by-passed to the service system by virtue of the fact that the port 116 in the top member 70 registers with port 123 in the intermediate member in this particular position of the valve, the flow being through the port 108' in the stator to the service system communicating therewith. In most valves after the brine valve has been closed, the raw water is allowed to continue to flow at the same low rate of flow as during salt wash, even though a greatly increased rate of flow is desirable. With the present valve, one may shift the intermediate member 71 in a counter-clockwise direction through approximately 15° to the rinse position shown in Fig. 13, in which a greatly increased rate of flow is permitted for more efficient rinsing of the bed of water softening material. During rinse, the port 124 in the intermediate member 71 is placed into communication not only with the small port 120 in the top member and the registering small port 112' in the stator, but it also registers with the port 117 in the top member 70 and port 109' in the stator. Hence, there is a greatly increased rate of flow over what small rate of flow would be possible through the nozzle 113 alone, the greater portion of the present flow being directly through the communicating ports 117, 124 and 109', although there will, of course, be still approximately the same flow as before through the nozzle 113 through ports 120, 124 and 112'. The change in position of the intermediate member 71 does not materially affect the registration of port 125 in the intermediate member with the port 111' in the stator, and consequently there is no obstruction to the flow out to the drain from port 125 through passage 127 and thence through registering ports 126 and 110'. During the rinse flow, water may be by-passed to the service system, as previously described, the change in position of the intermediate member having not materially altered the registration of the port 123 in the intermediate member with the ports 116 and 108'. The rinse flow is continued until the water discharged to the drain tests soft, whereupon the valve can be shifted back to the softening position.

In Figs. 3 and 4, I have illustrated a modification where an intermediate member 71' has a body 96' made almost in its entirety of molded rubber, there being only a small center metallic insert 95' for the operating connection between the intermediate member and the valve stem 76'. In this case, the insert 95' has an axial bearing 128 in which the lower end of the stem 76' is slidable up and down. The upper pin 90' is intended to cooperate with a top member 70 similarly as the pin 90 previously mentioned but the lower pin 91' in this form has its projecting ends slidable in diametrically opposed grooves 129 provided in the insert 95' on opposite sides of the bearing 128. In other words, with this construction the intermediate member 71' is arranged merely to be rotated by means of the stem 76' and not lifted and rotated as in the case of the intermediate member 71 previously described. It is believed that such a construction would be practical especially where the valve is shifted from one position to another fairly frequently and the intermediate member would not become "frozen" onto either of its related metallic valve members above and below the same.

In Figs. 5 and 6 I have shown another modification where the intermediate member 71a has the body 96a thereof made substantially entirely of molded rubber and provided on the top and bottom faces thereof with integral concentric projecting annular beads 130 around the ports therein, only one of the ports 123 being illustrated. These annular beads concentric with the ports and projecting from the plane of the top and bottom of the intermediate member it is believed will effect an extremely good seal between the intermediate member and the top member and between the intermediate member and the stator and permit reduction in the amount of spring pressure provided for holding the valve member in seated relationship.

It is believed the foregoing description conveys a good understanding of the objects and advantages of my invention. The appended claims have been drawn with a view to covering all legitimate modifications and adaptations.

I claim:

1. In a plate type valve, a ported body member, a ported plate member, and a ported rotary intermediate sealing member adapted to establish communication through the ports thereof between the ports of the body member and the ports of the plate member, means for unseating and reseating the plate member on the intermediate member, and means operative while the plate member is unseated for turning the intermediate member relative to the plate and body members from one operative position to another.

2. In a plate type valve, a ported body member, a ported plate member, and a ported movable intermediate sealing member adapted to establish communication through the ports thereof between the ports of the body member and the ports of the plate member, means for unseating and reseating the plate member on the intermediate member, and means operative while the plate member is unseated for shifting the intermediate member relative to the plate and body members from one operative position to another.

3. In a plate type valve, a ported body member, a ported plate member, and a ported rotary intermediate sealing member for establishing communication between the ports in the body member and the ports in the plate member, means for unseating and reseating the intermediate member and plate member with respect to one another and with respect to the body member, and means operative while the plate member is unseated for turning the intermediate member relative to the plate and body members from one operative position to another.

4. The combination in a rotary plate type valve of a stator member carrying a housing and having a plurality of ports, a plate member in the housing having ports adapted to register with the first-mentioned ports, a rotary intermediate sealing member in the housing between the plate and stator members having ports adapted to establish different communication between the ports in the plate and stator members in different positions of rotation of the sealing member, guide means comprising slidably inter-engaging portions on the plate member and the inside of the housing for holding the plate member against rotation while permitting axial movement thereof in seating and unseating, and a single manually operable stem operatively connected with the plate member and intermediate sealing member so as to unseat the plate member from the intermediate sealing member and turn the intermediate sealing member from one position to another.

5. A valve as set forth in claim 4, including spring means acting between the housing and the plate member tending normally to seat the plate member and intermediate sealing member in sealed relation on the stator member.

6. The combination in a rotary plate type valve of a stator member carrying a housing and having a plurality of ports, a plate member in the housing having ports adapted to register with the first-mentioned ports, a rotary intermediate sealing member in the housing between the plate and stator members having ports adapted to establish different communication between the ports in the plate and stator members in different positions of rotation of the sealing member, guide means comprising slidably inter-engaging portions on the plate member and the inside of the housing for holding the plate member against rotation while permitting axial movement thereof in seating and unseating, and a single manually operable stem operatively connected with the plate member and intermediate sealing member so as to unseat the plate member from the intermediate sealing member and unseat the intermediate sealing member from the stator member and turn the intermediate sealing member from one position to another.

7. A valve as set forth in cleam 6, including spring means acting between the housing and the plate member tending normally to seat the plate member and intermediate sealing member in sealed relation on the stator member, and means for limiting the unseating movement of the intermediate sealing member with relation to the stator member.

8. In a plate type valve, a ported body member, a ported plate member, one of said members being movable toward and away from the other member, a ported intermediate sealing member engaged between the plate and body members and adapted to establish different communication between the ports in said members in different positions of rotation of the sealing member, and means for separating the plate and body members and then turning the intermediate sealing member from one operative position to another.

9. In a plate type valve, a ported body member, a ported plate member, one of said members being movable axially toward and away from the other member, an intermediate sealing member comprising a body of non-metallic material providing opposed sealing surfaces for engagement with surfaces on the plate and body members and having ports provided therein affording communication between the ports in the plate and body members, said intermediate sealing member also comprising an actuating frame member embedded in the non-metallic body thereof, and means for separating said plate and body members and rotating the intermediate sealing member, said means being operatively connected with the frame member of said intermediate sealing member.

10. A valve as set forth in claim 9, wherein the last-mentioned means is operatively connected with the frame member of the intermediate sealing member so as to separate said intermediate sealing member from the plate and body members, the valve including means for limiting the separation of said intermediate sealing member from one of said plate and body members.

11. A valve as set forth in claim 9, wherein the intermediate sealing member has the non-metallic body thereof formed to provide projecting annular beads on the opposed faces thereof for engagement with the plate and body members, said beads being integral with the body and surrounding and being substantially concentric with the ports of said intermediate sealing member.

12. In a plate type valve, a ported body member, a ported plate member, and a ported movable intermediate sealing member adapted to establish communication through the ports thereof between the ports of the body member and the ports of the plate member, means for unseating and reseating the intermediate member and plate member with respect to one another and with respect to the body member, and means operative while the members are in unseated relationship for shifting the intermediate member from one operative position to another.

13. In a plate type valve, a ported body member, a ported plate member, one of said members being movable toward and away from the other member, a ported intermediate sealing member engaged between the plate and body members and adapted to establish different communication between the ports in said members in different positions of adjustment of the sealing member, and means for separating the plate and body members and then shifting the intermediate sealing member from one operative position to another.

14. In a plate type valve, a ported body member, a ported plate member, and a ported rotary intermediate sealing member comprising a body of molded rubber having a rigid actuating frame member embedded therein, said sealing member adapted to establish communication through the ports thereof between the ports of the body member and the ports of the plate member, means for unseating and reseating the plate member on the intermediate member, and means connected with the actuating frame member of said intermediate sealing member for turning the latter relative to the plate and body members from one operative position to another while the plate member is unseated.

15. In a plate type valve, a ported body member, a ported plate member, and a ported rotary intermediate sealing member comprising a body of molded rubber having a rigid actuating frame member embedded therein, said sealing member adapted to establish communication through the ports thereof between the ports of the body member and the ports of the plate member, means for unseating and reseating the intermediate member and plate member with respect to one another and with respect to the body member, and means connected with the actuating frame member of the intermediate sealing member for turning the latter relative to the plate and body members from one operative position to another while the members are in unseated relationship.

16. In a plate type valve, a ported body member, a ported plate member, and a ported movable intermediate sealing member adapted to establish communication through the ports thereof between the ports of the body member and the ports of the plate member, said intermediate sealing member comprising a body of molded rubber and a rigid actuating frame member embedded therein, means for unseating and reseating the plate member on the intermediate sealing member, and means connected with the actuating frame member of said intermediate sealing member for shifting the latter relative to the plate and body members from one operative position to another while the plate member is unseated.

17. In a plate type valve, a ported body member, a ported plate member, and a ported movable intermediate sealing member adapted to establish communication through the ports thereof between the ports of the body member and the ports of the plate member, said intermediate sealing member comprising a body of molded rubber and a rigid actuating frame member embedded therein, means for unseating and reseating the plate member and intermediate sealing member with respect to one another and with respect to the body member, and means connected with the actuating frame member of the intermediate sealing member for shifting the latter relative to the plate and body members from one operative position to another while said members are in unseated relationship.

18. In a plate type valve, a ported body member, a ported plate member, and a ported rotary intermediate sealing member adapted to establish communication through the ports thereof between the ports of the body member and the ports of the plate member, said intermediate sealing member comprising a body of molded rubber and a rigid actuating frame member embedded therein, and means connected with said actuating frame member of the intermediate sealing member for unseating the same from the body member and turning the same from one operative position to another.

19. In a plate type valve, a ported body member, a ported plate member, and a ported rotary intermediate sealing member adapted to establish communication through the ports thereof between the ports of the body member and the ports of the plate member, means connected with the intermediate member for unseating the same from the body member and turning the same relative to the plate and body members, and means operated by the last-mentioned means for unseating the plate member from the intermediate member.

20. In a plate type valve, a ported body member, a ported plate member, and a ported rotary intermediate sealing member adapted to establish communication through the ports thereof between the ports of the body member and the ports of the plate member, a manually operable stem movable first endwise and then rotatively, means providing a lost motion operating connection between said stem and the intermediate sealing member whereby said stem is first movable endwise relative to the intermediate member and then unseats said intermediate member from the body member, whereupon said intermediate member is rotatable by rotation of said stem, means limiting the unseating movement of said intermediate sealing member relative to the body member, and other means movable with the stem for unseating and reseating the plate member on the intermediate member.

EDWARD P. McCANNA.